July 19, 1960     H. E. KALLMANN     2,946,008

CURRENT GAIN MEASURING DEVICE

Filed Oct. 31, 1958

INVENTOR.
HEINZ E. KALLMANN

BY *MICHAEL S. STRIKER.*
*ATTORNEY.*

United States Patent Office 2,946,008
Patented July 19, 1960

2,946,008

CURRENT GAIN MEASURING DEVICE

Heinz E. Kallmann, 417 Riverside Drive,
New York 25, N.Y.

Filed Oct. 31, 1958, Ser. No. 770,966

9 Claims. (Cl. 324—158)

My invention relates to a new and simple circuit arrangement for the measurement of the current gain of current amplifiers.

Prominent among the devices capable of current amplification are transistors. Fig. 1 shows a circuit comprising a PNP type transistor comprising emitter E, base B, and collector C connected in the common-emitter circuit. If this circuit is to be used as a current amplifier, the output may be taken at the load inserted in the collector current path between the two terminals so marked, and the input may be fed to the two terminals marked "input," e.g., from an A.C. current source via a coupling capacitor not shown. In this circuit, a change in the base current $i_B$, that flows from its base B via a meter M and current controlling resistor $R_B$ to a forward biasing potential source $-E_0$, will result—in a manner familiar to those skilled in the art—in a proportional change in the collector current $i_C$ flowing from its collector C via a meter M' to the forward biasing potential source $-E_0$. The proportionality factor $\Delta i_C / \Delta i_B$ is the current gain beta; this is an important parameter but varies considerably between transistors even of the same type, therefore it is important to determine it by measurement. In Fig. 1, the direction of current is shown, and is accordingly described above, on the conventional concept that current flows from the positive terminal of a source via a circuit to the negative terminal.

The elementary circuit of Fig. 1 would not be convenient for routine use since it requires two costly meters, one to indicate accurately an increase in collector current, the other capable of measuring base currents of the order of one or a few microamperes. Measuring circuits have been proposed for finding beta indirectly by measuring the A.C. output at the collector when a known A.C. signal is fed to the base; but these circuits are rather involved since they require numerous and stable components.

It is therefore a main object of my invention to provide means for indicating the beta factor, i.e. the amplification ratio between input and output currents of an amplifier means in a most effective and simple, yet accurate, manner.

It is another object of my invention to provide a device for indicating the beta factor of commercial transistors which may have to be tested in this respect.

With above objects in mind, a preferred embodiment of my invention mainly consists in an amplification indicating device comprising, in combination, an electronic amplifier means having an input electrode and an output electrode; a source of bias potential; circuit means connecting said source of bias potential with said input electrode for feeding bias current to said input electrode; adjustable resistor means connected in said circuit means for varying the bias potential applied to said input electrode; a series-combination of normally open switch means and fixed bias resistor means connected in parallel with said adjustable resistor means for changing said bias current by a fixed amount when said switch means is moved to closed position; and meter means connected to said output electrode for indicating such change in the output current of said amplifier means as may be caused by changing said bias current by closing of said switch means, whereby the factor beta indicating the current amplification ratio between said bias current and said output current may be determined.

In another aspect of the invention, an amplification indicating device, for determining the beta factor of a transistor mainly comprises a measuring circuit including a source of D.C. potential and first, second and third terminals adapted to be respectively connected to the base, collector, and emitter electrodes, respectively, of a transistor to be tested; variable resistor means connected in said circuit between said source and said first terminal which is connectable to said base electrode, for adjusting a forward bias potential thus applied to said base electrode and accordingly the resulting bias current therethrough; a series-combination of normally open switch means and fixed resistor means connected in parallel with said variable resistor means for changing said bias current by a fixed amount when said switch means is moved to closed position; and meter means connected to said second terminal which is connectable to said collector electrode, for indicating such change in the output current of said transistor connected to said terminals, as may be caused by changing said bias current, whereby the factor beta indicating the amplification ratio between the base current and the collector current of said transistor means is determined.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
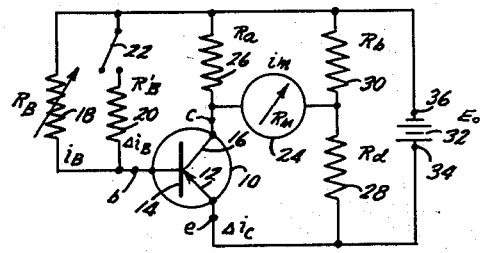
Fig. 2 is a schematic wiring diagram of a device for testing transistors for determining the beta factor thereof.

My circuit measures beta simply yet accurately with D.C., as the change in collector current $\Delta i_C$ when the base current is changed by a predetermined and known amount $\Delta i_B$. Fig. 2 shows one form of my circuit arrangement. A transistor 10 is connected with its electrodes 12, 14, 16, respectively, to terminals $e$, $b$, $c$, respectively, of the circuit arrangement. The path from emitter 12 to collector 16 of transistor 10 forms part of a bridge circuit, together with three other resistors 26, 30, 28, marked $R_a$, $R_b$, $R_d$, respectively, and the bridging D.C. meter 24 of resistance $R_m$, all fed by the supply voltage $E_0$ of a battery 32. Suitable values are for instance: $E_0=3$ volt; $R_a=R_b=250$ ohms; $R_d=2750$ ohms; $R_m=2020$ ohms for full scale sensitivity of 50 microamperes. At the start of the test switch 22 is open so that the base 14 is biased only via the uncalibrated adjustable resistor 18, marked $R_B$, connected to terminal 36 of source 32.

By reducing $R_B$ from an initially large value, the base current $i_B$ is increased and with it the collector current $i_C$, until the bridge is balanced and the measured current $i_m=0$. For the example given, this is the case when $i_C=1$ ma. Then the currents through all arms of the bridge are equal and the voltage between emitter 12 and collector 16 is 2.75 volt. Required current $i_B$ through $R_B$ depends on beta of the particular transistor and may range from less than 2 microamperes for very high beta to about 100 microamperes for the lowest practicable beta. The new circuit is based on the fact that the voltage between base 14 and emitter 12 under these conditions is of the order of 0.1 to 0.2 volt only, negligible compared to the supply voltage $E_0$. It follows that nearly the whole supply voltage (e.g. of 3.0 volt) must be reduced accordingly across $R_B$ which therefore has values of from 2 megohm for $i_B=1.5$ microamperes to 30 kilohms for $i_B=100$ microamperes. For a given supply voltage $E_0$ the variable value of $R_B$ fully determines the base current $i_B$. Further, whatever the value of $R_B$, if it is now shunted by a fixed known resistor 20, marked $R_B'$, then the additional current $\Delta i_B = E_0/R_B'$, and the total base current will be increased by just that fixed amount. If, for instance, $E_0=3.0$ volt and $R_B'=0.3$ megohm, the $i_B=10$ microamp. and the resulting increase $\Delta i_C = \beta \Delta i_B$.

Not all of $\Delta i_C$ will flow through the meter circuit as meter current $i_m$. But the fraction is easily computed for $R_a = R_b$ from $$\frac{\Delta i_C}{i_m} = \frac{R_d}{R_a + R_d} + 1 + \frac{R_m}{R_a}$$

For the example given above, the ratio is exactly 10:1; thus the full meter deflection of 50 microamp. requires an increase $\Delta i_C$ of 500 microamp. Since $\Delta i_C = \beta E_0/R_B'$, it follows that $$\beta = \frac{i_m R_B'}{E_0}\left(\frac{R_d}{R_a + R_d} + 1 + \frac{R_m}{R_a}\right)$$

Thus, for $\Delta i_B=10$ microamp., full meter deflection of 50 microamp. correspond to beta=50. It may be noted that the scale of the meter is linear for beta, and that without change in bridge arms, the scale factor may be changed by merely changing the value of $R_B'$ in the same proportion. By a different choice of bridge arms one may easily reduce the ratio $\Delta i_C/i_m$ so that a larger part of $\Delta i_C$ flows through the meter; a less sensitive meter will then suffice. I may also make the deflection sensitivity nonlinear, for instance logarithmic, so as to accommodate a large range of beta values with equal percentage accuracy throughout.

Figure 1:
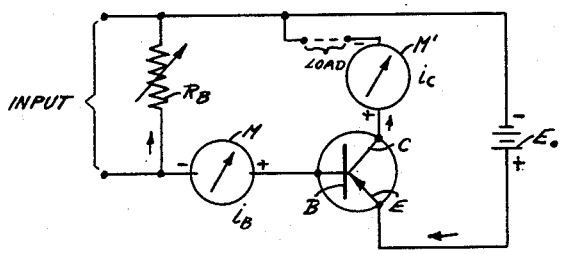
Fig. 1 is a schematic wiring diagram of a circuit capable of indicating the amplification ratio beta.
Figure 3:
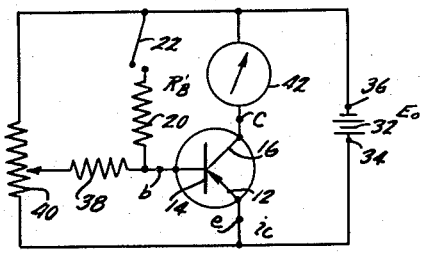
Fig. 3 is a schematic diagram of a modification of the circuit of Fig. 2.

The circuit of Fig. 3 is based on the same principle with alternative details both in the collector circuit and in the base circuit. In the former, the bridge circuit can be dispensed with if a special "suppressed-zero" type meter 42 is used. In appearance and essential construction, such meter is like any other D.C. meter, but its restoring-spring tension is so adjusted that the pointer—if free—would without current come to rest far off the lower end of the scale to the left; actually it will press against a stop at the left end of the scale. If a certain current $i_0$ is fed to the meter, the pointer will move from that stop to the start of the scale. With further increase in current, it will behave like any other meter. If, by varying the initial base current, now $i_C$ is made equal to $i_0$, that is, 1.0 milliamp. in the above example, then this meter circuit can be used like that of Fig. 1 but it will be more sensitive since now $\Delta i_C/i_m = 1$. Note that the value of $i_0$ does not much affect the measured value of beta; means to check and reset the meter zero are thus not needed.

The base circuit of Fig. 3 also differs somewhat from that of Fig. 2. The variable series resistor 18 subjected to a fixed forward biasing potential provided at terminal 36 is here replaced by a fixed resistor 38 which is very large as compared with the base-emitter impedance of the transistor 10, and connected to the tap of a variable voltage divider 40 fed, for instance, from the voltage source 32. Theory and operation are essentially the same in both cases; but note that the setting of the divider potentiometer 40 is approximately linear with base current while that of resistor 18 is proportional to $1/i_B$.

Figure 4:
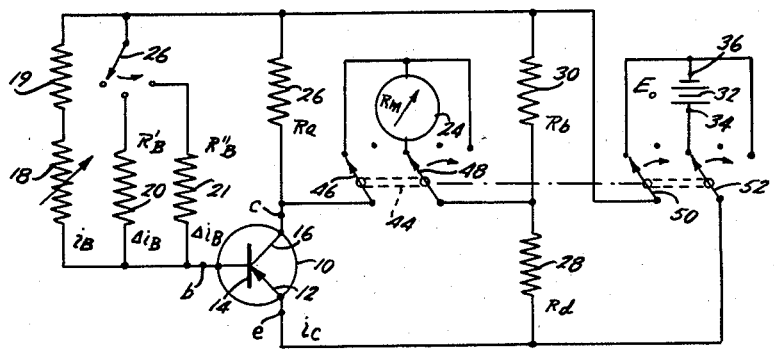
Fig. 4 is a schematic diagram of a more elaborate version of the circuit of Fig. 2, adapted to accommodate transistors of either polarity, and different ranges of beta.

The circuit of Fig. 4 is a more elaborate modification of that of Fig. 2, with like elements numbered alike; it offers two alternative ranges of beta by means of two fixed bias resistors 20 and 21 selectable by switch 26, and in addition, and independently thereof, it accommodates both PNP and NPN transistors by means of the four ganged switches 46, 48, 50 and 52 that permit to reverse the polarities of both the meter 24 and the voltage source 32 as is needed for proper operation of the PNP and NPN type transistors, respectively; 19 is a current-limiting minimum resistance.

The various modifications shown in Figs. 2–4 may be independently combined with each other as will be understood by those skilled in the art.

It will be understood that each of the elements described above, or two or more together, may also find a useful application in other types of current gain measuring devices differing from the types described above.

While the invention has been illustrated and described as embodied in devices for measuring the current gain of transistors, it is not intended to be limited to the details shown, since various modifications and structural changes may be made without departing in any way from the spirit of the present invention. For instance, in a circuit otherwise like those described above, and operated in the same way, a meter in series with the emitter electrode instead of the collector would measure a current change proportional to $(\beta+1)$ and thus also be suitable for determining the beta factor.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Current gain measuring device, comprising, in combination, an electronic amplifier means having an input electrode, an output electrode and a common electrode; a source of direct current potential having two terminals, one of said terminals being connected to said common electrode; circuit means connecting the other terminal of said source of electric potential with said input electrode for feeding bias current to said input electrode; adjustable resistor means connected in said circuit means for varying the bias potential applied to said input electrode; a series-combination of switch means movable between open and closed positions and fixed bias resistor means connected in parallel with said adjustable resistor means for changing said bias current by a fixed amount when said switch means is moved from one to its other position; and meter means connected between said output electrode and said other terminal of said source for indicating such change in the output current of said amplifier means as may be caused by changing said bias current by moving said switch means from one to its other position, whereby the factor beta indicating the current amplification ratio between said bias current change and said output current change may be determined.

2. Current gain measuring device, comprising, in combination, transistor means having a base electrode, an emitter electrode and a collector electrode; a source of direct current potential having two terminals, one of said terminals being connected to said emitter electrode; circuit means connecting the other terminal of said source of electric potential with said base electrode for feeding bias current to said base electrode; adjustable resistor means connected in said circuit means for varying the bias potential applied to said base electrode; a series-combination of switch means movable between open and closed positions and fixed bias resistor means connected in parallel with said adjustable resistor means for changing said bias current by a fixed amount when said switch means is moved from one to its other position; and meter means connected between said collector electrode and and said other terminal of said source for indicating such change in the collector current of said amplifier means as may be caused by changing said bias current by moving said switch means from one to its other position, whereby the factor beta indicating the current amplification ratio between said bias current change and said collector current change may be determined.

3. Current gain measuring device, for determining the beta factor indicating the current amplification ratio between a change of the input current and a change of the output current of a transistor, comprising, in combination, a measuring circuit including a source of direct current potential and first, second and third terminals adapted to be respectively connected to the base, collector, and emitter electrodes, respectively, of a transistor to be tested, said first and second terminals being connected with one terminal of said source, said third terminal being connected with the other terminal of said source; variable resistor means connected in said circuit between said one terminal of said source and said first terminal which is connectable to said base electrode, for adjusting the bias current therethrough; a series-combination of switch means movable between open and closed positions and fixed resistor means connected in parallel with said variable resistor means for changing said bias current by a fixed amount when said switch means is moved from one to its other position; and meter means connected between said one terminal of said source of potential and said second terminal which is connectable to said collector electrode, for indicating such change in the output current of said transistor connected to said terminals, as may be caused by changing said bias current, whereby the factor beta indicating the amplification ratio between the base current change and the collector current change of said transistor means is determined.

4. Current gain measuring device, for determining the beta factor indicating the current amplification ratio between a change of the input current and a change of the output current of a transistor, comprising, in combination, a measuring circuit including a source of direct current potential and first, second and third terminals adapted to be respectively connected to the base, collector, and emitter electrodes, respectively, of a transistor to be tested, said first and second terminals being connected with one terminal of said source, said third terminal being connected with the other terminal of said source; variable resistor means connected in said circuit between said one terminal of said source and said first terminal which is connectable to said base electrode, for adjusting a forward bias potential thus applied to said base electrode and accordingly the resulting bias current therethrough, said variable resistor means comprising a voltage divider arrangement including a potentiometer device connected in series with said source, and a fixed resistor means connected at one end thereof with said first terminal and with its other end to the movable tap contact of said potentiometer; a series-combination of switch means movable between open and closed positions and fixed resistor means connected in parallel with said variable resistor means for changing said bias current by a fixed amount when said switch means is moved from one to its other position; and meter means connected between said one terminal of said source of potential and said second terminal which is connectable to said collector electrode, for indicating such change in the output current of said transistor connected to said terminals, as may be caused by changing said bias current, whereby the factor beta indicating the amplification ratio between the base current change and the collector current change of said transistor means is determined.

5. Current gain measuring device, for determining the beta factor indicating the current amplification ratio between a change of the input current and a change of the output current of a transistor, comprising in combination, a measuring circuit including a source of direct current potential and first, second and third terminals adapted to be respectively connected to the base, collector, and emitter electrodes, respectively, of a transistor to be tested, said measuring circuit further including a bridge circuit having a first and a second arm both formed by first and second fixed resistor means, both jointly connected at one of their ends to one terminal of said source, the third arm being formed by the emitter-collector circuit of a transistor connected between said second and third terminals, the latter terminal being connected to the opposite terminal of said source, the fourth arm being formed by a third fixed resistor means connected with one end also to said opposite terminal of said source; variable resistor means connected in said circuit between said one terminal of said source and said first terminal which is connectable to said base electrode, for adjusting bias current therethrough; a series-combination of switch means movable between open and closed positions and fixed resistor means connected in parallel with said variable resistor means for changing said bias current by a fixed amount when said switch means is moved from one to its other position; and meter means being connected in the diagonal of said bridge circuit between a first junction point located between the second end of said first resistor means and said second terminal, and a second junction point between the respective other ends of said second and third resistor means, for indicating such change in the output current of said transistor connected to said terminals, as may be caused by changing said bias current, whereby the factor beta indicating the amplification ratio between the base current charge and the collector current charge of said transistor means is determined.

6. Current gain measuring device, for determining the beta factor indicating the current amplification ratio between a change of the input current and a change of the output current of a transistor, comprising, in combination, a measuring circuit including a source of direct current potential and first, second and third terminals adapted to be respectively connected to the base, collector, and emitter electrodes, respectively, of a transistor to be tested, said measuring circuit further including a bridge circuit having a first and a second arm both formed by first and second fixed resistor means both jointly connected at one of their ends to one terminal of said source, the third arm being formed by the emitter-collector circuit of a transistor connected between said second and third terminals, the latter terminal being connected to the opposite terminal of said source; the fourth arm being formed by a third fixed resistor means connected with one end also to said opposite terminal of said source; variable resistor means connected in said circuit between said one terminal of said source and said first terminal which is connectable to said base electrode, for adjusting bias current therethrough; a series-combination of switch means movable between open and closed positions and fixed resistor means connected in parallel with said variable resistor means for changing said bias current by a fixed amount when said switch means is moved from one to its other position, said fixed bias resistor means including a plurality of fixed bias resistors connected at one of their ends, respectively, in parallel with each other to said first terminal and said switch means being a change-over switch alternatively connectable to one of the other ends, respectively, of said fixed bias resistors for selectively using any one of these resistors and thereby choose between different beta ranges to be determined; and meter means being connected in the diagonal of said bridge circuit between a first junction point located between the second end of said first resistor means and said second terminal, and a second junction point between the respective other ends of said second and third resistor means, for indicating such change in the output current of said transistor connected to said terminals, as may be caused by changing said bias current, whereby the factor beta indicating the amplification ratio between the base current change and the collector current change of said transistor means is determined.

7. Current gain measuring device, for determining the beta factor indicating the current amplification ratio between a change of the input current and a change of the output current of a transistor, comprising, in combination, a measuring circuit including a source of direct current potential and first, second and third terminals adapted to be respectively connected to the base, collector, and emitter electrodes, respectively, of a transistor to be tested, said first and second terminals being connected with one terminal of said source, said third terminal being connected with the other terminal of said source; variable resistor means connected in said circuit between said one terminal of said source and said first terminal which is connectable to said base electrode, for adjusting the bias current therethrough; a series-combination of switch means movable between open and closed positions and fixed resistor means connected in parallel with said variable resistor means for changing said bias current by a fixed amount when said switch means is moved from one to its other position; meter means connected between said one terminal of said source of potential and said second terminal which is connectable to said collector electrode, for indicating such change in the output current of said transistor connected to said terminals, as may be caused by changing said bias current; and change-over switch means connected for reversing the polarity of said source and of said meter means with respect to the rest of said circuit, so that PNP and NPN type transistors, respectively, can be tested alternatively with said change-over switch means in one or the other of its positions, whereby the factor beta indicating the amplification ratio between the base current change and the collector current change of said transistor means is determined.

8. Current gain measuring device, for determining the beta factor indicating the current amplification ratio between a change of the input current and a change of the output current of a transistor, comprising in combination, a measuring circuit including a source of direct current potential and first, second and third terminals adapted to be respectively connected to the base, collector, and emitter electrodes, respectively, of a transistor to be tested, said measuring circuit further including a bridge circuit having a first and a second arm both formed by first and second fixed resistor means, both jointly connected at one of their ends to one terminal of said source, the third arm being formed by the emitter-collector circuit of a transistor connected between said second and third terminals, the latter terminal being connected to the opposite terminal of said source, the fourth arm being formed by a third fixed resistor means connected with one end also to said opposite terminal of said source, variable resistor means connected in said circuit between said one terminal of said source and said first terminal which is connectable to said base electrode, for adjusting the bias current therethrough; a series-combination of switch means movable between open and closed positions and fixed resistor means connected in parallel with said variable resistor means for changing said bias current by a fixed amount when said switch means is moved from one to its other position; meter means being connected in the diagonal of said bridge circuit between a first junction point located between the second end of said first resistor means and said second terminal, and a second junction point between the respective other ends of said second and third resistor means, for indicating such change in the output current of said transistor connected to said terminals, as may be caused by changing said bias current; and change-over switch means being connected for reversing the polarity of said source and of said meter means with respect to the rest of said circuit, so that PNP and NPN type transistors, respectively, can be tested alternatively with said change-over switch means in one or the other of its positions, whereby the factor beta indicating the amplification ratio between the base current change and the collector current change of said transistor means is determined.

9. Current gain measuring device, for determining the beta factor indicating the current amplification ratio between a change of the input current and a change of the output current of a transistor, comprising in combination, a measuring circuit including a source of direct current potential and first, second and third terminals adapted to be respectively connected to the base, collector, and emitter electrodes, respectively, of a transistor to be tested, said measuring circuit further including a bridge circuit having a first and a second arm both formed by first and second fixed resistor means, both jointly connected at one of their ends to one terminal of said source, the third arm being formed by the emitter-collector circuit of a transistor connected between said second and third terminals, the latter terminal being connected to the opposite terminal of said source, the fourth arm being formed by a third fixed resistor means connected with one end also to said opposite terminal of said source; variable resistor means connected in said circuit between said one terminal of said source and said first terminal which is connectable to said base electrode, for adjusting the bias current therethrough; a series-combination of switch means movable between open and closed positions and fixed resistor means connected in parallel with said variable resistor means for changing said bias current by a fixed amount when said switch means is moved from one to its other position, said fixed bias resistor means including a plurality of fixed bias resistors connected at one of their ends, respectively, in parallel with each other to said first terminal and said switch means being a change-over switch alternatively connectable to one of the other ends, respectively, of said fixed bias resistors for selectively using any one of these resistors and thereby choose between different beta ranges to be determined; meter means being connected in the diagonal of said bridge circuit between a first junction point located between the second end of said first resistor means and said second terminal, and a second junction point between the respective other ends of said second and third resistor means, for indicating such change in the output current of said transistor connected to said terminals, as may be caused by changing said bias current; and change-over switch means being provided for reversing the polarity of said source and of said meter means with respect to the rest of said circuit, so that PNP and NPN type transistors, respectively, can be tested alternatively with said change-over switch means in one or the other of its positions, whereby the factor beta indicating the amplification ratio between the base current change and the collector current change of said transistor means is determined.

References Cited in the file of this patent

Bohr: "Radio Electronics," August 1954, pp. 30–32.
Hamlin: "Radio Electronics," February 1957, pp. 61–63.
Prewett: "Wireless World," August 1958, pp. 369–371.
Sylvan: "Electronic Industries," October 1958, pp. 90 and 91.